Patented Oct. 31, 1922.

1,434,304

UNITED STATES PATENT OFFICE.

OTTO CONSTANTINE MATTHEWS, OF SAVANNAH, GEORGIA.

WORMPROOF ANTIFOULING PAINT.

No Drawing. Application filed June 5, 1922. Serial No. 566,102.

*To all whom it may concern:*

Be it known that I, OTTO C. MATTHEWS, a citizen of the United States, residing at Savannah, in the county of Chatham and State of Georgia, have invented certain new and useful Improvements in Wormproof Antifouling Paint; and I do declare the following to be a full, clear, and exact description of the invention, such as will enable others skilled in the art to which it appertains to make and use the same.

This invention relates to improvements in worm-proof antifouling paints for the bottoms of wooden vessels and other woodwork which is submerged in salt water.

Its object is to preserve the wood, for long periods of time, against the action of marine organisms which foul ships' bottoms, and also against the depredations of boring worms.

My improved composition consists of an oil mixture or vehicle and a pigment mixture or body. By suitable combinations in preparing these mixtures, I attain results which cannot be accomplished by the ingredients singly.

While various proportions may be used, I have found the following very satisfying.

| Oils. | Quantity. |
|---|---|
| "Kidney" oil (distilled of rosin) | 1 quart |
| Boiled linseed oil | 1 pint |
| Pine oil | 1 pint |
| Gloss oil | 2 quarts |
| Spirits of naphtha | 2 gills (½ pint) |

To the foregoing mixture is added—

| | |
|---|---|
| Cobalt drier or Japan paint drier | 3½ ounces |
| Muriatic (hydrochloric) acid | 3 ounces |

| Pigments. | Quantity. |
|---|---|
| Paris green | 1 pound |
| Copper bronze | 1 pound |
| ?Prince metallic | 2 pounds |
| Beta fat (a mixture of refuse cotton seed oil, lard and fat acid, obtainable on the market under the name of beta fat) | 4 pounds |
| Lamp black | 1 dram |
| Red oxide of mercury | ½ pound |

To the foregoing is added:

| | |
|---|---|
| Calcium arsenate | 1 pound |
| Cement | 3 pounds |

These mixtures are thoroughly stirred together and applied to the surface. The boiled linseed oil serves as a binder and affords wearing qualities to the mixtures. The pine oil is highly penetrative and aids in preserving the wood. The gloss oil is a compound mixture on the market containing calcium resinate, its high penetrating power aids in carrying the poisons into the wood and it is itself of preservative power. The spirits of naphtha also is penetrative, but evaporates rapidly and acts as a drier for the whole compound. The beta fat thickens the paint and gives it a body. The muriatic (hydrochloric) acid is used to thicken the oil.

Thus combined, the paint has not only an exceedingly high penetrative power, but also is of sufficient body and firmness after drying to assure months of satisfactory service and protection.

What I claim is:

1. An antifouling paint comprising gloss oil, kidney oil, pine oil, spirits of naphtha, calcium arsenate, Paris green, beta fat and prince metallic.

2. A worm-proof antifouling paint comprising kidney oil, boiled linseed oil, pine oil, gloss oil, drier, spirits of naphtha, calcium arsenate, Paris green, copper bronze, prince metallic, cement, beta fat and red oxide of mercury.

3. A worm-proof antifouling paint comprising kidney oil, boiled linseed oil, pine oil, gloss oil, drier, spirits of naphtha, calcium arsenate, Paris green, copper bronze, prince metallic, cement, beta fat, muriatic acid, and red oxide of mercury.

In testimony whereof I affix my signature in presence of two witnesses.

OTTO CONSTANTINE MATTHEWS.

Witnesses:
MARGARET ST. CLAIR,
T. F. RICHARDS.